US008099857B2

(12) United States Patent
Shelley et al.

(10) Patent No.: US 8,099,857 B2
(45) Date of Patent: Jan. 24, 2012

(54) APPARATUS FOR ELECTRICAL PIN INSTALLATION AND RETENTION CONFIRMATION

(75) Inventors: Marlin C. Shelley, Bountiful, UT (US); Kevin W. Shelley, Bountiful, UT (US); Michael B. Daley, West Jordan, UT (US); Scott D. Meredith, Stansbury Park, UT (US); Todd D. Rich, Riverton, UT (US); Jon A. Bertrand, Taylorsville, UT (US); Brett C. Zufelt, Bountiful, UT (US); Kevin M. Denning, Payson, UT (US)

(73) Assignee: Cirris Systems Corporation, Salt Lake City, UT (US)

( * ) Notice: Subject to any disclaimer, the term of this patent is extended or adjusted under 35 U.S.C. 154(b) by 513 days.

(21) Appl. No.: 12/366,532

(22) Filed: Feb. 5, 2009

(65) Prior Publication Data

US 2009/0199396 A1 Aug. 13, 2009

Related U.S. Application Data

(60) Provisional application No. 61/027,460, filed on Feb. 9, 2008.

(51) Int. Cl.
*B23P 21/00* (2006.01)

(52) U.S. Cl. ........................................................ 29/709

(58) Field of Classification Search .................... 29/709, 29/712, 714, 718, 721, 701, 703, 707; 700/114, 700/83; 324/583
See application file for complete search history.

(56) References Cited

U.S. PATENT DOCUMENTS

| | | | |
|---|---|---|---|
| 3,605,234 | A | 9/1971 | Bogursky |
| 3,811,168 | A | 5/1974 | Anderson et al. |
| 4,028,812 | A | 6/1977 | Fieberg |
| 4,211,108 | A | 7/1980 | Seitz et al. |
| 4,247,980 | A | 2/1981 | Tominoi |
| 4,462,155 | A | 7/1984 | Brunelle et al. |
| 4,606,420 | A | 8/1986 | Silver |
| 4,631,823 | A | 12/1986 | Collier et al. |
| 4,638,558 | A | 1/1987 | Eaton |
| 4,653,159 | A | 3/1987 | Henderson et al. |
| 4,653,160 | A | 3/1987 | Thorkildsen et al. |
| 4,658,212 | A | 4/1987 | Ozawa et al. |
| 4,658,503 | A | 4/1987 | Eaton |
| 4,677,734 | A | 7/1987 | Bloch et al. |
| 4,715,100 | A | 12/1987 | Cross |
| 4,727,637 | A | 3/1988 | Buckwitz et al. |
| 4,757,606 | A | 7/1988 | Eaton |

(Continued)

FOREIGN PATENT DOCUMENTS

JP 2002-365483 12/2002

(Continued)

*Primary Examiner* — John C Hong
(74) *Attorney, Agent, or Firm* — Madson IP, P.C.

(57) ABSTRACT

The electrical pin installation apparatus provides a user with a real time video display of the process of pinning an electrical connector body. Such real time video display substantially improves the user's ability to accurately and effectively install electrical pins into electrical connectors without the attendant electrical test equipment and fixturing of prior art devices. The apparatus assists in the pinning process by providing various prompts and guides to guide the user in error-proof pin installation. The apparatus further includes built-in electrical pin insertion and retention load assessment to assure proper insertion and retention loads are applied during the pin installation process. Additionally, the apparatus may include storage of manufacturing data as it is inputted into the apparatus.

21 Claims, 6 Drawing Sheets

U.S. PATENT DOCUMENTS

| | | | |
|---|---|---|---|
| 4,779,334 | A | 10/1988 | Boutcher, Jr. |
| 4,787,138 | A | 11/1988 | Eaton et al. |
| 4,803,778 | A | 2/1989 | Cross |
| 4,825,537 | A | 5/1989 | Berry et al. |
| 4,849,743 | A | 7/1989 | Ohno |
| 4,864,718 | A | 9/1989 | Ricard |
| 4,936,011 | A | 6/1990 | Berry et al. |
| 4,947,546 | A | 8/1990 | Bowling et al. |
| 4,949,451 | A | 8/1990 | Pech |
| 4,967,470 | A | 11/1990 | Folk |
| 5,033,186 | A | 7/1991 | Gaskell |
| 5,033,188 | A | 7/1991 | Polliard et al. |
| 5,052,104 | A | 10/1991 | Tran |
| 5,063,656 | A | 11/1991 | Hirano et al. |
| 5,083,370 | A | 1/1992 | Koch et al. |
| 5,083,863 | A | 1/1992 | Cerda |
| 5,119,546 | A | 6/1992 | Cameron et al. |
| 5,155,907 | A | 10/1992 | Dornes et al. |
| 5,157,830 | A | 10/1992 | Koch |
| 5,179,775 | A | 1/1993 | Bogotzek et al. |
| 5,198,983 | A | 3/1993 | Blake et al. |
| 5,315,756 | A | 5/1994 | Jurjevic et al. |
| 5,333,374 | A | 8/1994 | Pittau |
| 5,335,413 | A | 8/1994 | Yamamoto et al. |
| 5,365,659 | A | 11/1994 | Ueda et al. |
| 5,410,801 | A | 5/1995 | Shiloh et al. |
| 5,459,924 | A | 10/1995 | Ohsumi et al. |
| 5,477,606 | A | 12/1995 | Igura |
| 5,485,660 | A | 1/1996 | Pittau |
| 5,504,990 | A | 4/1996 | Pittau |
| 5,537,741 | A | 7/1996 | Peterson et al. |
| 5,575,060 | A | 11/1996 | Ohta et al. |
| 5,588,206 | A | 12/1996 | Maejima et al. |
| 5,590,457 | A | 1/1997 | Ninchi |
| 5,598,628 | A | 2/1997 | Maejima |
| 5,682,672 | A | 11/1997 | Taniguchi et al. |
| 5,689,191 | A | 11/1997 | Kashiyama |
| 5,696,687 | A | 12/1997 | DeMotte et al. |
| 5,709,025 | A | 1/1998 | Wuyts |
| 5,727,312 | A | 3/1998 | Maejima et al. |
| 5,740,602 | A | 4/1998 | Peterson et al. |
| 5,761,796 | A | 6/1998 | Imgrüt et al. |
| 5,774,981 | A | 7/1998 | Maejima et al. |
| 5,774,983 | A | 7/1998 | Maejima |
| 5,813,111 | A | 9/1998 | Maejima et al. |
| 5,831,438 | A | 11/1998 | Okura |
| 5,850,694 | A | 12/1998 | Maejima |
| 5,903,970 | A | 5/1999 | Pittau |
| 5,903,971 | A | 5/1999 | Ishiwata et al. |
| 5,996,223 | A | 12/1999 | Ogawa et al. |
| 6,038,763 | A | 3/2000 | Kodera et al. |
| 6,116,935 | A | 9/2000 | Fukuda |
| 6,128,810 | A | 10/2000 | Suzuki et al. |
| 6,141,867 | A | 11/2000 | Fukada et al. |
| 6,195,884 | B1 | 3/2001 | Miyamoto et al. |
| 6,212,763 | B1 | 4/2001 | Newman |
| 6,212,766 | B1 | 4/2001 | Ohsumi et al. |
| 6,269,538 | B1 | 8/2001 | Takada |
| 6,272,387 | B1 | 8/2001 | Yoon |
| 6,276,052 | B1 | 8/2001 | Avenoso et al. |
| 6,360,436 | B1 | 3/2002 | Takada |
| 6,447,346 | B2 | 9/2002 | Sasaki et al. |
| 6,489,780 | B2 | 12/2002 | Yoshida |
| 6,612,021 | B1 | 9/2003 | Taniguchi et al. |
| 6,615,486 | B1 | 9/2003 | Takada |
| 6,662,444 | B2 | 12/2003 | Takada |
| 6,793,401 | B2 | 9/2004 | Daniel |
| 6,799,370 | B2 | 10/2004 | Shekel et al. |
| 6,842,975 | B2 | 1/2005 | Revel et al. |
| 6,877,208 | B2 | 4/2005 | Shirakawa et al. |
| 6,954,262 | B2 | 10/2005 | Buzzetti |
| 6,961,996 | B2 | 11/2005 | Soriano |
| 6,989,895 | B2 | 1/2006 | Buzzetti |
| 6,993,833 | B2 | 2/2006 | Inada et al. |
| 7,024,760 | B2 | 4/2006 | Soriano |
| 7,093,351 | B2 | 8/2006 | Kelley et al. |
| 7,113,273 | B2 | 9/2006 | Pahk et al. |
| 7,243,415 | B2 | 7/2007 | Revel et al. |
| 7,270,565 | B2 | 9/2007 | Kamata et al. |
| 7,296,334 | B2 | 11/2007 | Kamata et al. |
| 2006/0185158 | A1 | 8/2006 | Kuhn |
| 2007/0277372 | A1 | 12/2007 | Aida et al. |

FOREIGN PATENT DOCUMENTS

JP 20022365483 * 12/2002

* cited by examiner

APPARATUS FOR ELECTRICAL PIN INSTALLATION AND RETENTION CONFIRMATION

CROSS-REFERENCED RELATED APPLICATIONS

This patent application claims the benefit of U.S. Provisional Patent Application Ser. No. 61/027,460 that was filed on Feb. 9, 2008, for an invention titled APPARATUS FOR ELECTRICAL PIN INSTALLATION AND RETENTION CONFIRMATION.

BACKGROUND OF THE INVENTION

1. Field of the Invention

The present invention relates to guided insertion of electrical pins into electrical connectors and to retention confirmation of such electrical pins. In particular, the invention relates to an improved apparatus for guided pin insertion that assists in assuring a correctly "pinned" electrical connector.

2. Description of the Related Art

The proper insertion of electrical pins into electrical connector bodies is often a tedious and time consuming process requiring significant manual dexterity and long-term concentration, both being highly error prone. A single "mis-wire" can have catastrophic consequences for the down-stream user of the resultant wiring harness.

Accordingly, it is known in the art to provide pin insertion assistance devices for use in properly "pinning" or inserting pins in corresponding electrical connectors. Specifically, the following list of U.S. patents and applications disclose inventions related to pinning devices and each is incorporated herein by this reference: U.S. Pat. Nos. 4,658,212, 4,658,503, 4,757,606, 4,787,138, 4,803,778, 4,864,718, 4,947,546, 4,949,451, 5,083,370, 5,689,191, 6,116,935, 6,447,346, 6,489,780, 6,799,370, 6,989,895, 7,243,415, 7,270,565, 20060185158, and 20070277372. However, such devices do not provide the advantages of the embodiments of the present invention. Such embodiments significantly reduce or eliminate mis-wiring errors and visually aide pin placement with proper insertion and retention force.

SUMMARY OF THE INVENTION

The present invention is an apparatus for the guided or assisted insertion of electrical connector pins into a proper corresponding electrical connector body cavity, and for the confirmation of retention of such electrical connector pins. The apparatus comprises a pinning station with a mounting device having clamping jaws for holding an electrical connector body and a two-way load-detecting device having a load cell, a video camera, one or more input devices, a computer, and one or more output devices such as a video display screen.

The load cell is in electrical communication with the computer such that detected loads are transmitted to the computer. This electrical communication, and any other electrical communication decribed herein, can be of any suitable type known in the art whether hard wired or wireless.

The camera is adjustably mounted to the holding device such that the camera may be manipulated to have a line of sight to the mounting device, whether the line of sight is direct or indirect. The camera is further in electrical communication with the computer such that a signal is provided to the computer. The camera may be of any suitable type, however, a video camera that provides a real time video signal is preferred.

Each input device is also in electrical communication with the computer such that input signal(s) can be provided to the computer. Any of a number of known input devices can be used either alone or in combination with one or more of the input devices. Examples of input devices that can be used include, but are not limited to, a keyboard, a camera, a number key pad, any type of code reader such as a bar code reader, a color reader, an optical scanner, a microphone, a voice recognition device, any type of pointing device such as a mouse, a track ball, or a joy stick, and a cable tester.

The computer is in electrical communication with each output device. Any of a number of known output devices can be used either alone or in combination with one or more of the output devices. Although it is preferred that at least a monitor with a video display screen for displaying real time video be included among the output devices used, examples of other output devices include, but are not limited to, audio speakers, a colored light, a laser, a vibrating device, a voice synthesizer and a buzzer.

In a preferred embodiment, the computer is programmed such that an overlay of a historical image of the electrical connector body is shown overlaid on an actual real time video of the electrical connector body in a manner to be more fully described hereinafter. This overlay is adjustable to determine the degree of the overlay so that the user is able to ignore or not be distracted by obstructions. For example, a portion of the actual real time video may be adjusted so that obstructions such as the user's hand or other already placed pins fade into shadow or are removed so that the user can see the proper cavity for insertion without these obstructions.

In practice, an electrical connector body is mounted in the clamping jaws, centered, and oriented in preparation for pin placement. This centering and orientation can be aided by a visual depiction of at least two pin cavities on the video display screen for the user to align with the electrical connector body. The computer determines the alignment pin cavities after receiving input information from an input device regarding the type of electrical connector body for which pin placement is to be performed. The computer may have preprogrammed information about multiple types of electrical connector bodies in its memory or in an accessible database.

Each electrical connector body has cavities designed to receive insertable members and retain them for use as an electrical connector in an electric system. These insertable members may be any of a number of types of electrical wires with pin ends, optical fiber ends, or seal plugs. The seal plugs are used to close/cover unused cavities to prevent moisture or debris from entering the unused cavity and compromise the electrical connection.

To assist in the pin placement process, real time video of the electrical connector body is displayed on the video display screen. The real time video magnifies the image of the connector body so that user can better see what is transpiring during pin installation. Information displayed on the video display screen can also provide other instructions or aides to assist the user in the pin placement process.

Once the electrical connector body is properly positioned within the clamping jaws, the electrical connector body is ready for the insertion of an insertable member. The user may select an insertable member for insertion. Each insertable member typically has an identifying indicia that identifies the insertable member. This identifying indicia may take one or more forms such as wire insulation color, a bar code, an alpha-numeric code, and/or a scanable code. This identifying indicia is inputted to the computer to enable the computer to recognize the insertable member the user desires to insert.

The computer is programmed to receive input of the identifying indicia from the insertable member via the input device. A program within the computer identifies the cavity corresponding to correct pin placement for that insertable member and highlights the proper cavity on the video display screen. Additionally, the display may also provide a substantially enlarged view of the electrical connector body. As compared to the actual size of the electrical connector body, this enlarged view provides a magnification of the video in the immediate area for the insertion. Thus, an operator is readily able to see in real time an enlarged view of the pin insertion process which significantly aids in the proper pin insertion.

In embodiments where a video display screen is not used, the computer signals some other type of output device to identify the proper cavity, for example, the cavity may be highlighted by a light or laser beam.

In the event that an insertable member does not have identifying indicia, a cable tester can be used to identify the insertable member and transmit that identification to the computer.

In one embodiment, the computer may be preprogrammed to determine the order in which the insertable members are inserted. This pre-ordering of the installation of the insertable members dictates to the user the order for placement so that installation is orderly and avoids problems where already inserted insertable members may surround and obscure the proper cavity, making it difficult for the user to accomplish proper insertion.

The computer may be programmed to detect proper and improper electrical pin insertion through comparing the pixel display of a pin insertion to a predetermined proper pin insertion pixel display. This process is called AOI (i.e., automated optical inspection) and is performed automatically to determine proper or improper pin placement. Further, the computer is programmed to provide an error indicator if the pin is inserted into the incorrect cavity. The error indicator can be any suitable indicator such as, for example, a sound associated with the error that is emitted from the computer and/or a visual error indicator such as the color red displayed over the wrongly selected cavity or any other visual signal.

The computer is also programmed to detect the proper and improper application of force during pin installation. An affirmative indicator is provided if the pin is inserted into the correct cavity with the proper amount of force. The affirmative indicator can be any suitable indicator that can be differentiated from the error indicator such as, for example, a sound associated with the correct pin placement that is emitted from the computer and/or a highlight over the correctly pinned cavity in a color such as green or some other visual signal.

Upon detecting an insertion load in excess of the proper insertion range, an alarm may be provided. This alarm can be any suitable alarm such as, for example, a visual and/or audible indication that the insertion load is outside the proper range.

Similarly, a proper retention load may be detected. Upon detecting a retention load in a proper retention load range, a success acknowledgement signal of any suitable type may be provided to indicate that the pin has been successfully placed and that the next pin can be inserted. This success acknowledgement signal may be, for example, any suitable visual, audible, and/or kinetic acknowledgement. Similar to when excessive insertion force is used, upon detecting a retention load in excess of the proper retention range, an alarm may be provided. This alarm can be the same as the alarm used for excessive insertion force or any suitable alarm such as, for example, a visual and/or audible indication that the retention load is outside the proper range.

It is contemplated that proper pin placement can be accomplished using an apparatus that comprises a camera, a device for holding the electrical connector body in the camera's line of sight, a computer, one or more input devices, and a monitor to visually display output data, without using the load-sensing feature of the present invention. Similarly, it is also contemplated that proper pin placement can be accomplished without using the real time video feature of the present invention. Such an apparatus would use a device for holding the electrical connector body connected to a load sensor, a computer, any of a number of known devices for targeting the proper cavity for pin placement (i.e., an insertion indicator), and an output device to give the user output data relating to the load sensed.

Reference throughout this specification to features, advantages, or similar language does not imply that all of the features and advantages that may necessarily be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, or materials. In other instances, well-known structures, materials, or operations are not shown or described in detail to avoid obscuring aspects of the invention.

The invention is an apparatus for the guided or assisted insertion of insertable members such as electrical connector pins into a proper corresponding electrical connector body cavity, and for the confirmation of retention of such electrical connector pins. The apparatus comprises a mounting device having clamping jaws for holding an electrical connector body and a two-way load detecting device with a load cell, a camera such as a video camera, one or more input devices, a computer, and one or more output devices such as a video display screen.

The load cell electrically communicates with the computer such that detected loads are transmitted to the computer.

The video camera is adjustably mounted to a holding device so that the camera can be positioned to have a line of sight to the clamping jaws and an electrical connector body held therein. The video camera also electrically communicates with the computer to provide a video signal to the computer.

Each input device electrically communicates with the computer to provide input signal(s) to the computer.

The computer electrically communicates with each output device. When the video display screen is used as an output device, real time video can be displayed on the video display screen. In one embodiment, the computer is programmed such that an overlay of an historical image of the electrical connector body is shown overlaid on an actual real time video displayed of the electrical connector body.

In order to facilitate an understanding of the present invention in reviewing the drawings accompanying the specification, like features are like numbered throughout all of the figures.

Figure 1:
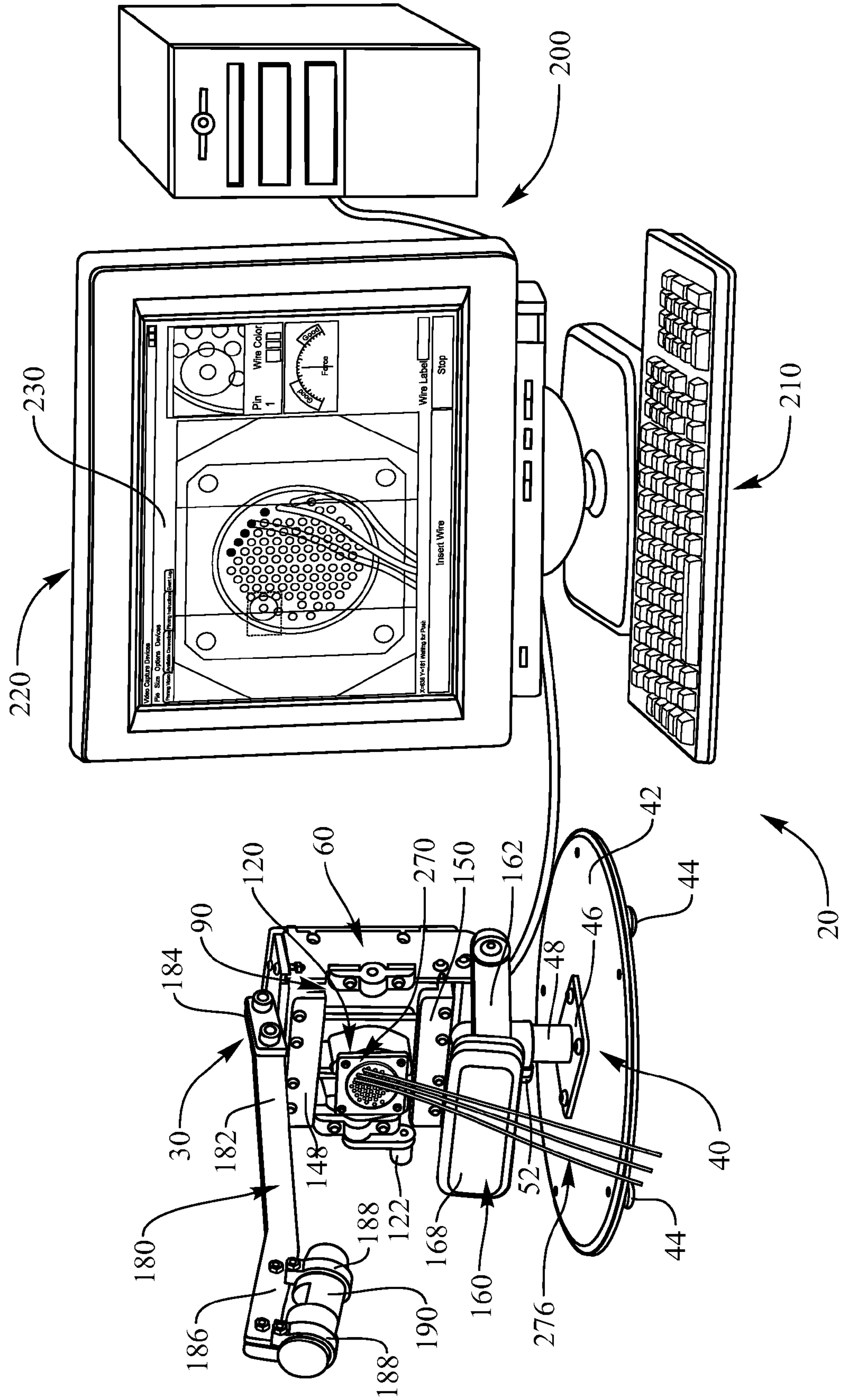
FIG. 1 is a perspective view of an embodiment of the pin installation apparatus showing a keyboard as an example of an input device.

Referring generally to FIG. 1 of the drawings, an embodiment of the invention is a pin installation apparatus 20 comprising a pinning station 30, a computer 200, an input device 210 such as the keyboard shown, and an electronic display monitor 220 having a video display screen 230.

Figure 2:
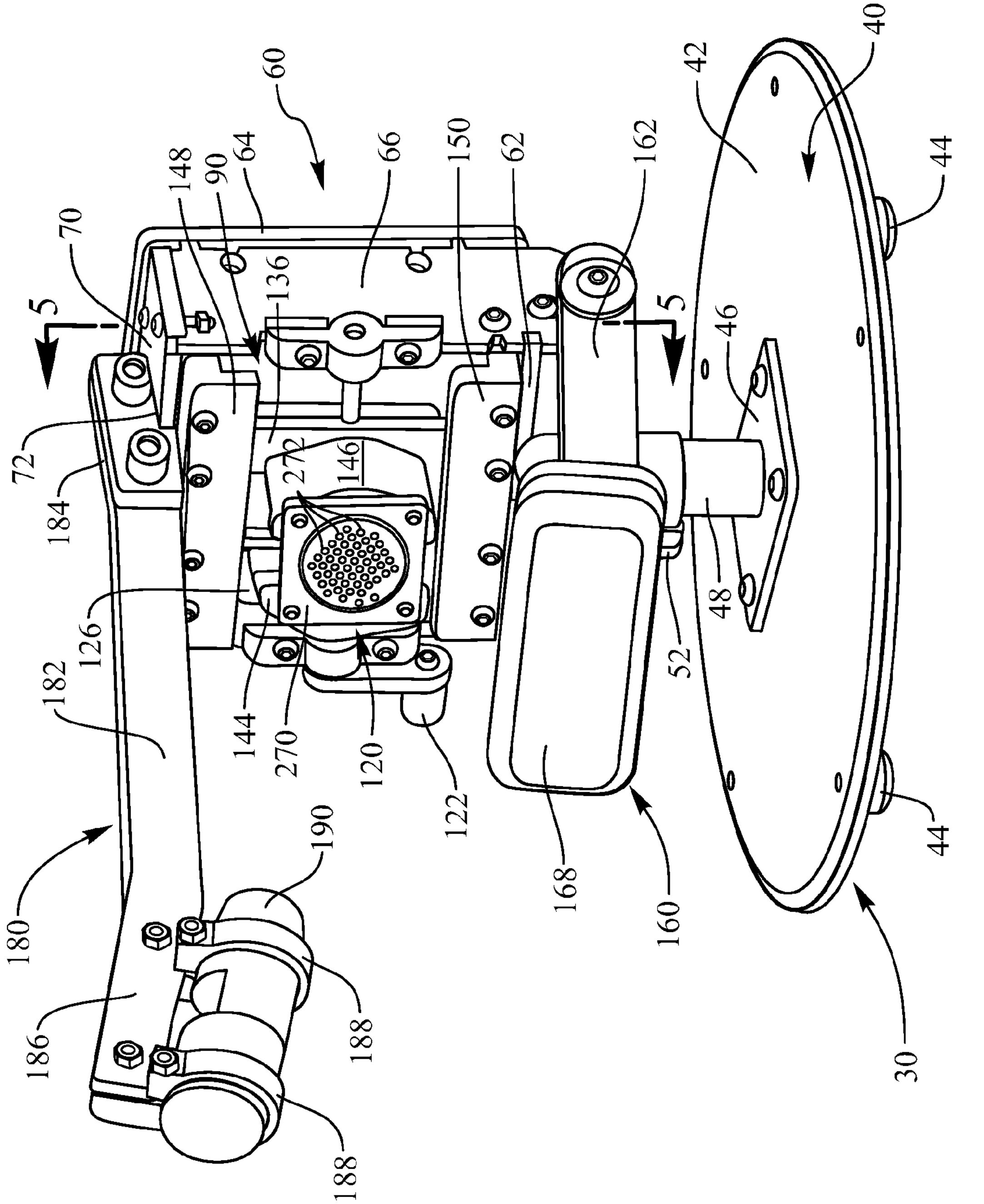
FIG. 2 is a perspective view of the pinning station portion of the pin installation apparatus.

As best shown in FIG. 2, pinning station 30, comprises a base assembly 40, a chassis assembly 60, a load-sensing assembly 90, a centering vise assembly 120, a hand rest assembly 160, and a camera arm assembly 180. FIGS. 1 and 2 each shows an electrical connector body 270, properly centered and oriented, secured within the centering vise assembly 120 so that the pin cavities 272 are properly oriented.

Base assembly 40 (best shown in FIG. 3) further comprises a base plate 42, a plurality of feet 44, a lower attach plate 46, a post 48, a cap 50, a thumbscrew 52, and an upper attach plate 54 having an upper plate arm 56. Each of the components of base assembly 40 may be fabricated from suitable materials. Feet 44 are preferably fabricated from rubber or like high friction material. Base assembly 40 is assembled such that feet 44 are fastened to base plate 42, lower attach plate 46 is fastened to base plate 42, post 48 is attached to lower attached plate 46, cap 50 is mounted to post 48, and upper attach plate arm 56 of upper attach plate 54 is swivably mounted to cap 50. Further, thumbscrew 52 is adjustably connected to cap 50 such that upper attach plate 54 may be positioned and repositioned and then fixed in place by loosening and subsequently tightening thumbscrew 52.

Figure 3:
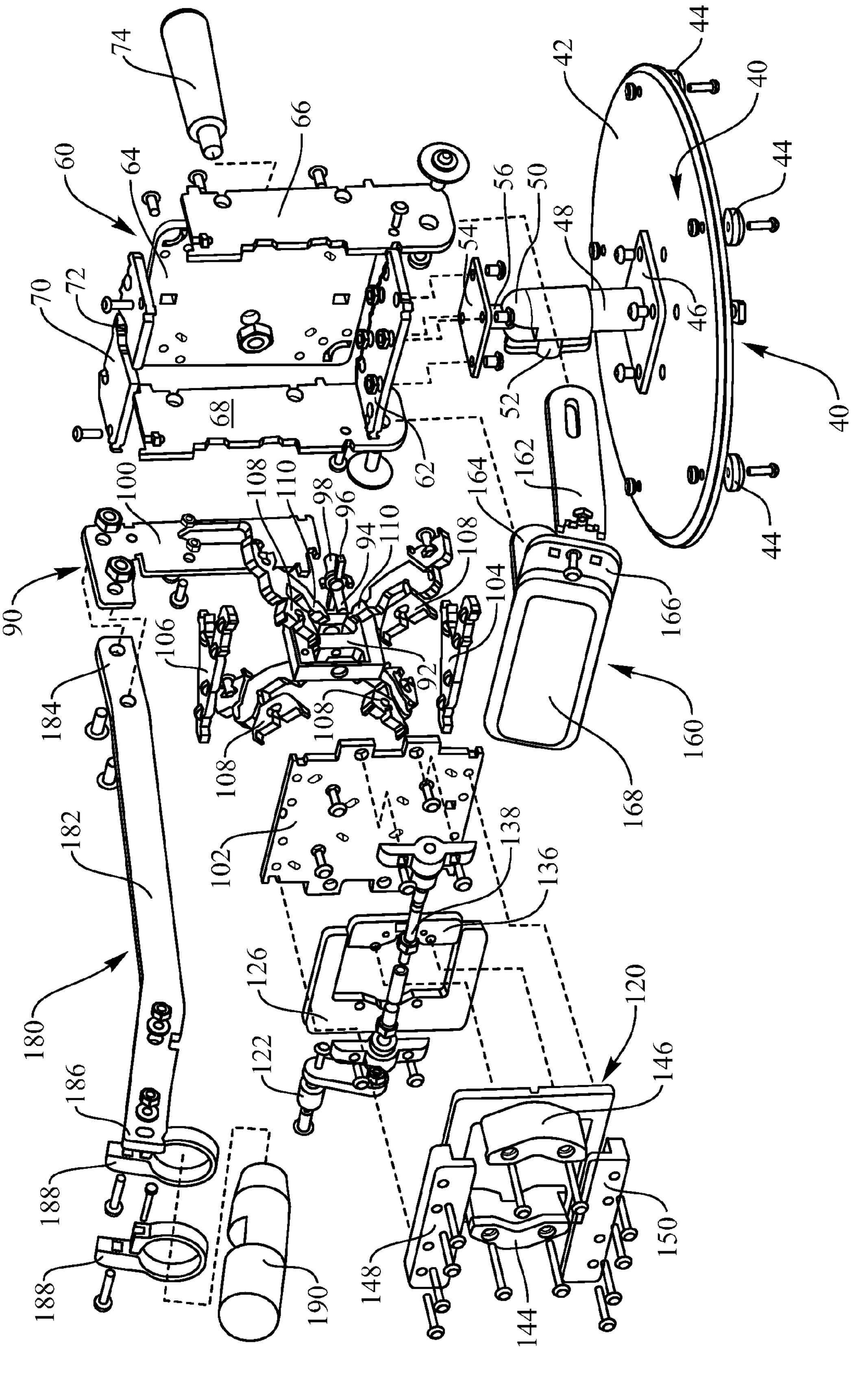
FIG. 3 is an exploded perspective view of the pinning station.

As best viewed in FIG. 3, chassis assembly 60 comprises a base plate 62, a back plate 64, a first side plate 66, a second side plate 68, a top plate 70 having a notch 72, and a handle 74. Each of the components of chassis assembly 60 may be fabricated from suitable materials. Chassis assembly 60 is assembled such that base plate 62, back plate 64, first side plate 66, second side plate 68, and top plate 70 are connected together to form an open box-like structure. Further, the handle 74 is attached to back plate 64 and enables the user to manipulate the position of the chassis assembly 60.

Figure 5:
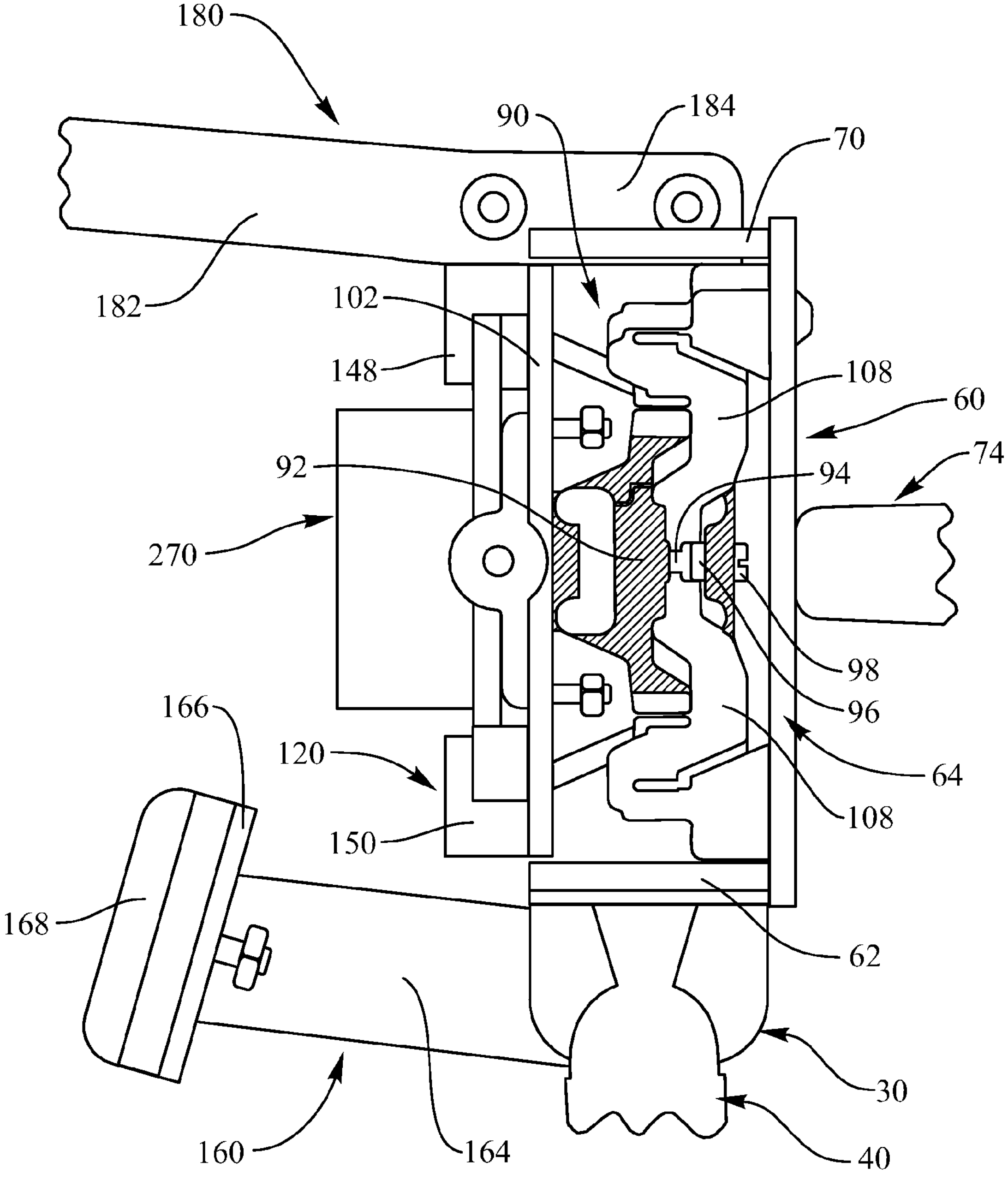
FIG. 5 is a cross-sectional view of the pinning station taken at the location indicated by the section arrows in FIG. 2, with some portions of the device not shown and only the load cell shown cross-hatched for clarity.

Load-sensing assembly 90, best shown in FIGS. 3 and 5, comprises a standard commercially available load sensor such as a load cell 92, a threaded spacer 94, a lever combining washer 96, a set screw 98, a load cell support arm 100, a load-sensing plate 102, a lower support plate 104, an upper support plate 106, and a plurality of load-sensing levers 108. Each of the components of load-sensing assembly 90 except for load cell 92 may be fabricated from suitable materials. The load cell 92 is constructed in a manner and of materials known in the art. A cross-sectional view of the load-sensing assembly 90 as fully assembled is shown in FIG. 5, wherein the load cell 92 is shown cross-hatched.

The load-sensing lever 108 is of a generally known configuration that conveys a load applied to the load cell 92 by being flexible in a first direction and yet substantially stiff or inflexible in other directions. Accordingly, load-sensing lever 108 has a predetermined stiffness that facilitates the operation of the load-sensing assembly 90 in a manner known to skilled artisans.

The load-sensing assembly 90 is assembled such that threaded spacer 94, lever combining washer 96, set screw 98, and load cell summing tabs 110 of the load-sensing levers 108 are operatively connected to the load cell 92. The load cell support arm 100 positions and supports the load cell 92. The load-sensing plate 102 is attached to the load-sensing levers 108. The lower support plate 104 and upper support plate 106 are also attached to the load-sensing plate 102. It is noted that threaded spacer 94, lever combining washer 96, and set screw 98 are adjustable to adjust the load-sensing assembly 90. The load-sensing assembly 90 is preferably adjusted such that any resulting gap between the summing tabs 110, load cell 92, and lever combining washer 96 is minimized and yet not such that summing tabs 110 bind between load cell 92 and lever combining washer 96, resulting in a substantially accurate sensing and indication of loading applied to load cell 92 from insertion or retention loads.

Referring again to FIG. 3, the centering vise assembly 120 comprises a hand crank 122, a first movable support 126, a second movable support 136, a drive mechanism 138, a first jaw 144, a second jaw 146, an upper vise retention bracket 148, and a lower vise retention bracket 150. The load sensor (load cell 92) functionally communicates with the centering vise assembly 120, whether mechanically or otherwise, such that a load applied to the centering vise assembly 120 is detected by the load sensor. Each of the components of the centering vise assembly 120 may be fabricated from suitable materials.

The centering vise assembly 120 is assembled such that hand crank 122 is connected to the drive mechanism 138 that is supported rotatingly by the first movable support 126 and the second movable support 136. The first jaw 144 is connected to the first movable support 126, and second jaw 146 is connected to the movable support 136. Upper vise retention bracket 148 and lower vise retention bracket 150 are slidingly positioned to retain jaws 144 and 146 in a proper orientation. As the hand crank 122 is operated, the first movable support 126 and the second movable support 136 move towards or away each other at the same rate. This, in turn, moves the second jaw 146 towards or away from the first jaw 144 to center and enable clamping engagement and release from clamping engagement of the electrical connector body 270 within the centering vise assembly 120.

Although the embodiment described and shown utilizes a centering vise assembly 120 having first and second movable support s 126, 136, it is contemplated and a skilled artisan would understand how a different centering vise system could be used. For example, one support could be movable and one fixed or a different configuration could be used.

Figure 4:
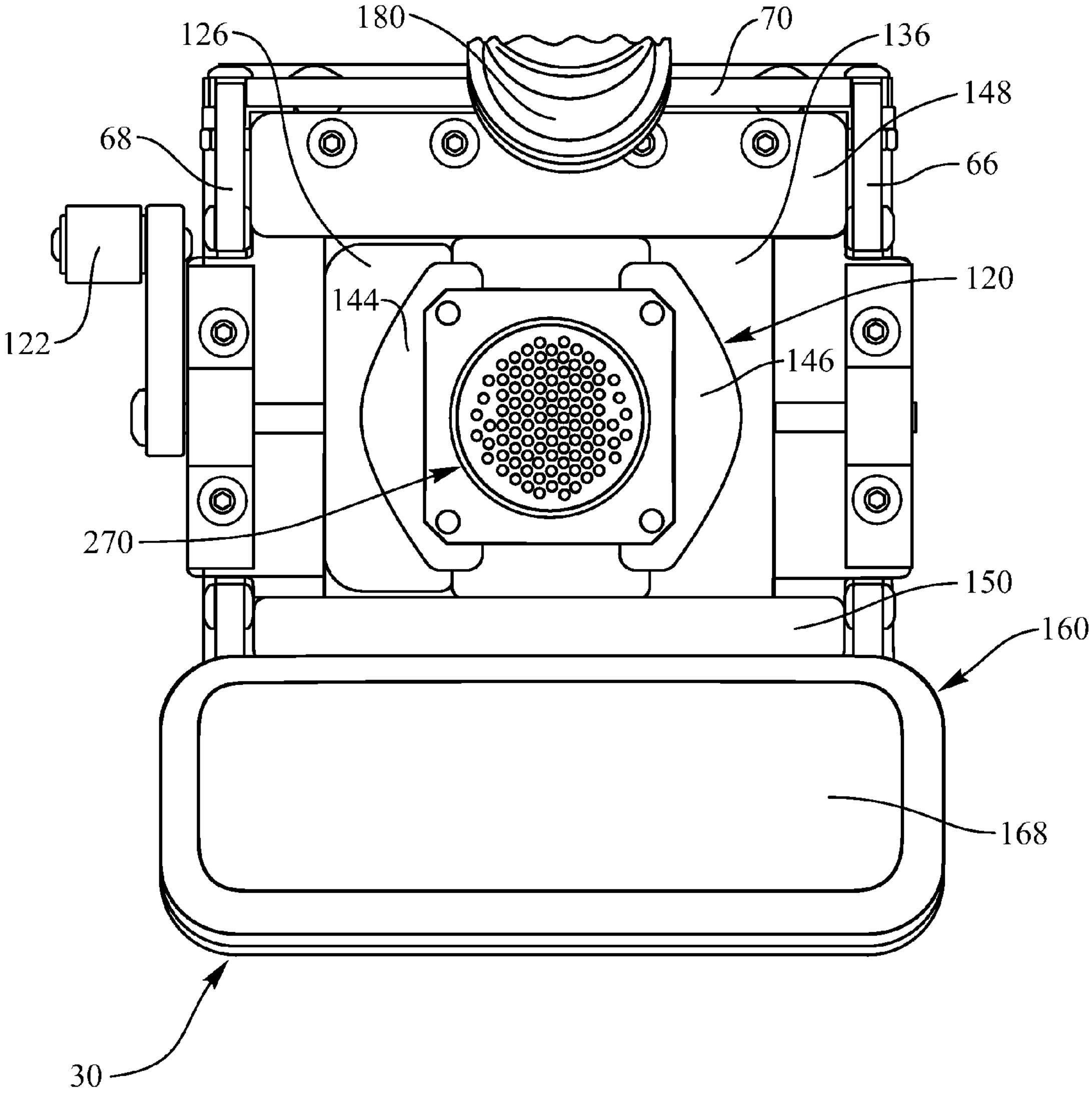
FIG. 4 is a partially cut-away elevational view of the centering vise assembly portion of the pinning station with the vise shown in a closed position holding an electrical connector.

Hand rest assembly 160, as best shown in FIGS. 3-5, comprises a first support arm 162, a second support arm 164, a rest plate 166, and a rest pad 168. Each of the components of the hand rest assembly 160 may be fabricated from suitable materials. Rest pad 168 is preferably fabricated from a resiliently compressible material. The hand rest assembly 160 is assembled such that first support arm 162 and the second support arm 164 support and suspend the rest plate 166. The rest pad 168 is secured to rest plate 166. The hand rest assembly 160 is connected to and supported by chassis assembly 60 and positioned such that an operator of the pin installation apparatus 20 can rest his/her hands on the rest pad 168 without compromising readings being made by the load-sensing assembly 90.

Referring to FIGS. 1-3, the camera arm assembly 180 comprises a camera support arm 182 having a first end 184 and a second end 186, a plurality of camera attachment brackets 188, and a camera 190. Although any suitable camera 190 may be used, it is preferred that camera 190 is a standard preferably color universal serial bus (USB) connectable video camera 190. Each of the components of camera arm assembly 180 may be fabricated from suitable materials. Camera arm assembly 180 is assembled such that brackets 188 are connected to second end 186 of camera support arm 182, and camera 190 is mounted via the brackets 188.

The pinning station 30 is assembled such that upper attach plate 54 of base assembly 40 is connected to base plate 62 of chassis assembly 60, with load cell support 100 positioned in top plate notch 72. The load-sensing levers 108, stationary support 126, movable support 136, upper vise retention bracket 148, and lower vise retention bracket 150 of centering vise assembly 120 are connected to the load-sensing plate 102 of load-sensing assembly 90. The first support arm 162 and second support arm 164 of hand rest assembly 160 are connected to first side plate 66 and second plate 68 of chassis assembly 60. The camera support arm first end 184 of camera arm assembly 180 is connected to load cell support arm 100 of load-sensing assembly 90. With the pinning station 30 thus assembled, pinning station 30 is adapted such that chassis assembly 60 is rotatably adjustable with respect to base assembly 40, and hand rest assembly 160 is rotatably adjustable with respect to the chassis assembly 60.

Pinning station 30 is further adapted such that a rotation of hand crank 122 in a first direction causes first and second jaws 144, 146 to close, and rotation of hand crank 122 in a second direction causes first and second jaws 144, 146 to open.

Further, the pinning station 30 is adapted such that when an insertion type load is applied to the centering vise assembly 120, the centering vise assembly 120, load-sensing assembly 90, and camera arm assembly 180 move somewhat in a first direction with respect to chassis assembly 60 and an insertion load is sensed by load cell 92. Similarly, when a retention type load is applied to centering vise assembly 120, the centering vise assembly 120, load-sensing assembly 90, and camera arm assembly 180 move somewhat in a second direction with respect to chassis assembly 60 and a retention load is sensed by load cell 92. It is noted that pinning station 30 is adapted to be calibrated as needed such that an actual load detected by load cell 92 is properly and accurately displayed on display screen 230.

Computer 200 may be a standard commercially available personal computer or any suitable computing device that is preferably capable of running standard commercially available software and capable of emitting predetermined sounds. Of course, any suitable computing device configured to receive the inputs contemplated herein, interpret such inputs, and provide the desired outputs, whether audible, visual, or kinetic can be used and is within the knowledge of the skilled artisan.

Any of a number of input devices may be used to communicate with computer 200. The keyboard 210 shown in FIG. 1 is just one example of an input device and is a standard commercially available keyboard that functions as a data input device to allow the input of data such as a wire identification number 212 (an example of a wire identification indicia appears on wires 276 shown in FIG. 6 as a wire band with printed indicia thereon) into computer 200. Alternate input devices are contemplated and may be used alone or in combination with each other and with keyboard 210. For instance, rather than a keyboard, the input device may take the form of a scanner, a voice input device (e.g., a microphone), or any combination of a keyboard, a scanner, and a microphone. In such optional instance, the user may optionally speak a wire identification number 212 for input into computer 200 via voice recognition software or a voice recognition device or the data may be scanned for input into computer 200. Additionally, a cable tester may be used to identify a wire that has no identification indicia. In such a case, the cable tester provides the identification indicia 212 by probing the insertion end of the wire with a probe from the cable tester. Once identified, the cable tester provides the wire identification indicia 212 to the computer 200. Cable testers that can perform this function are well known.

The electronic display monitor 220 communicates with the computer 200 and may be a standard commercially available display monitor. Monitor 220 may be, for instance, a CRT (Cathode Ray Tube) type display monitor, an LCD (Liquid Crystal Display) type monitor, or a plasma type display monitor or any other type of monitor. Electronic display monitor 220 is preferably adapted to show visually a display 230.

Figure 6:
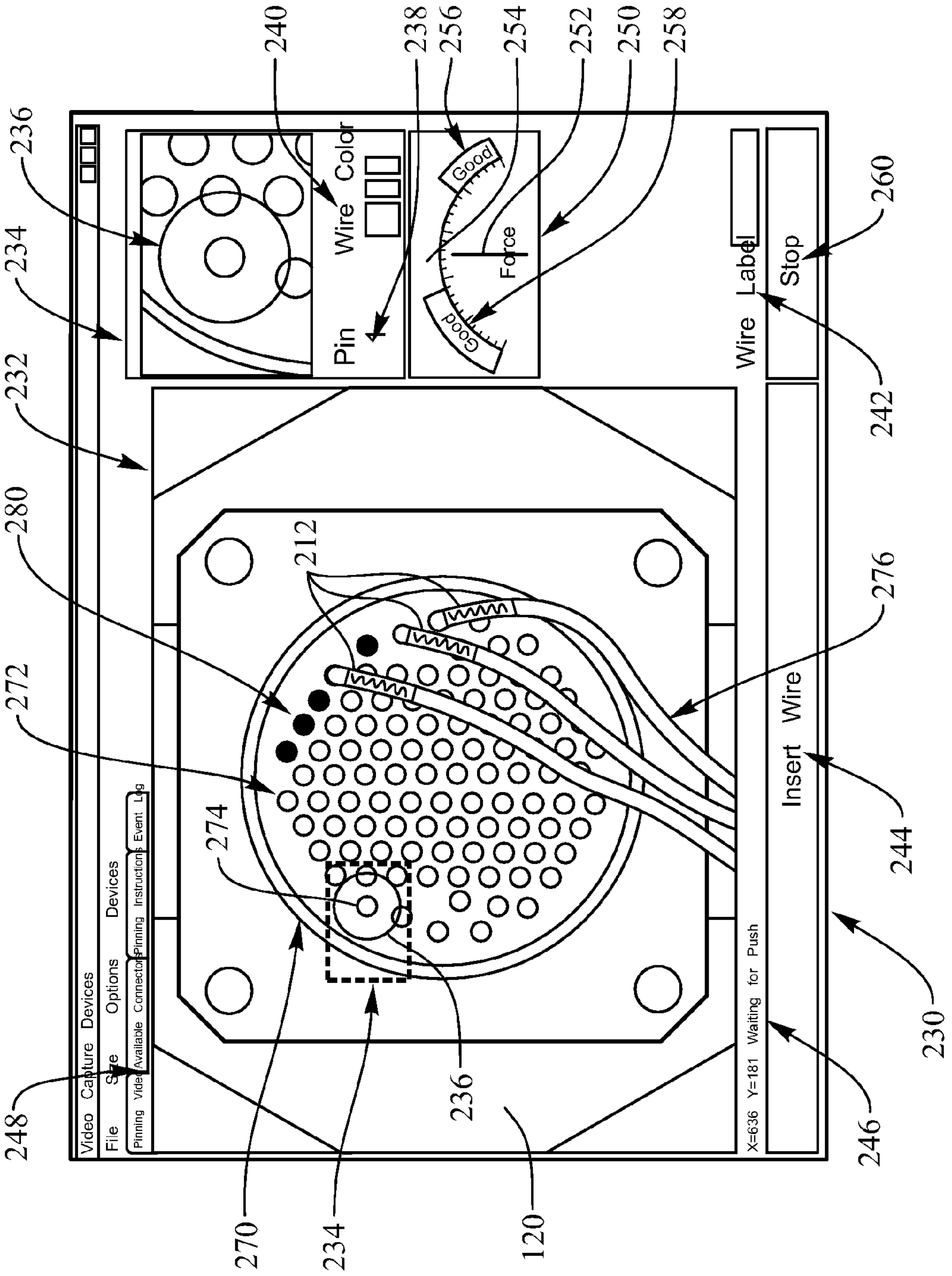
FIG. 6 is an enlarged view of an exemplary screen display.

Although the display 230 may have any suitable configuration, display 230, as best shown in FIG. 6, preferably includes a screen main viewing area 232, an enlarged viewing area 234, a pin cavity indication circle 236, a pin position identification display 238, a pin wire color display 240, a wire label display 242, a user prompt display 244, a status indication display 246, a selectable functions area 248, a load indication display 250, and a STOP display 260.

Load indication display 250 preferably further includes a load indication needle 252, an intermediate load range 254, a sufficient insertion load range 256, and a sufficient retention load range 258.

Apparatus 20 is assembled such that load cell 92 of load-sensing assembly 90, keyboard 92, and electronic display monitor 220 electrically communicate with computer 200, and electrical power is supplied to apparatus 20.

In practice, for a user to perform an assisted installation of electrical wires into an electrical connector body 270, the following steps are performed on an electrically powered pin installation apparatus 20 as described herein. A select electrical connector 270 is placed between first and second jaws 144, 146, centered, oriented, and clamped into position. The proper position and orientation of the electrical connector 270 can be assisted and confirmed as described more fully below. Data corresponding to electrical connector 270 is entered into computer 200 via manually typing the data corresponding to electrical connector 270 on keyboard 210, or by any other suitable manual or automated means such as by scanning data corresponding to electrical connector 270 or by voice recognition of data corresponding to electrical connector 270. By inputting such data into computer 200, a program within the computer 200 loads electrical wire 276 and seal plug 280 position data and displays a preprogrammed historical image of the electrical connector 270 on display screen 230.

The user positions the electrical connector body 270 within first and second jaws 144, 146 and manually rotates and centers the electrical connector body 270. When properly centered and oriented, the user tightens first and second jaws 144, 146 about the electrical body 270 by turning hand crank 122 in a first direction. The user may be assisted in this process by the computer 200 providing alignment instructions or aides, whether audible or visual or a combination of both. Such aides may, for example, be a visual depiction of at least two pin locations for the user to manipulate the electrical connector 270 so that the pin locations depicted align with corresponding pin cavities in the electrical connector 270. A view of electrical connector 270 is displayed on display screen 230 as shown in FIG. 6.

With respect to one embodiment, the real time video display of electrical connector 270 and a preprogrammed historical image of electrical connector 270 are substantially overlaid or positioned coincident to each other. A selected area around the cavity to receive the pin placement (e.g., the pin cavity indication circle 236) does not display the overlay, but displays only the real time video in that area. Outside that area, the overlay is present and the user can select the degree to which each image is visible. With the real time video being totally visible, the user's hand and the wire (and previously pinned wires) are visible to the user. As the user selects a lesser degree of visibility of the real time video, the user's hand and other obstructions fade to shadow revealing more and more of the historical image until the real time video is replaced by the historical image everywhere except in the selected area around the desired cavity. In this manner, the user can determine how much of the real time video image is visible and can choose to ignore obstructions.

The user is prompted to input an electrical wire 276 (or other insertable member) identification number into computer 200 by prompt 244. An identification number of a first electrical wire 276 is inputted into computer 200 and is subsequently displayed at wire label display 242 by typing the identification number on keyboard 210 or alternately by inputting the identification number by using another type of input device.

In response to the input of an electrical wire identification number, computer 200 displays pin position identification 238 and pin wire color 240, and the pin cavity indication circle 236 is overlaid over the proper pin cavity 274 in both screen main viewing area 232 and in enlarged viewing area 234, and prompt 244 prompts the user to insert an electrical wire 276 (the actual electrical wire 276 to be inserted is not shown in FIG. 6 so not to obscure the insert viewing area 234) into the proper indicated pin cavity 274 (as distinguished from the other pin cavities 272). While viewing the movement and the installation of electrical wire 276 in real time on display screen 230, the user inserts the electrical wire 276 into the indicated pin cavity 274.

To assure proper installation by means of a proper installation load range, the user applies an installation load to electrical wire 276, causing load cell 92 to detect the installation load and transmit the detected load to load indication display 250 of display screen 230 by means of the computer 200. The applied installation load is increased until load indication needle 252 moves from intermediate load indication range 254 to sufficient or "good" load installation range 256.

Upon load indication needle 252 moving into sufficient load installation range, an affirmative indicator such as an audible tone or sound associated with use of a proper amount of insertion force and prompt 244 changes to an "apply retention load" type prompt. The user stops applying an insertion load and begins to apply a retention load (a load opposite to an installation load). It is noted that if a detected installation load exceeds sufficient load installation range 256, prompt 244 may change to a "load exceeded" type prompt and an alarm such as an audible "load exceeded" verbal prompt or a buzzer or other distinguishable sound may be emitted by computer 200 or a suitable output device.

The applied retention load is increased until load indication needle 252 moves from intermediate load indication range 254 to sufficient or "good" load retention range 258. Upon load indication needle 252 moving into the sufficient load retention range, a success acknowledgement signal such as an audible tone is sounded by computer 200 or a visual acknowledgment is provided. Upon success acknowledgement, prompt 244 may change to an "input next electrical wire identification" type prompt. The user stops applying a retention load. It is noted that if a detected retention load exceeds sufficient load retention range 258, prompt 244 may change to a "load exceeded" type prompt and/or an alarm such as an audible "load exceeded" verbal prompt or buzzer may be emitted by computer 200 or a suitable output device.

It should be noted that as more and more pins are inserted, the weight of the wires applies a load to the load cell 92. Consequently, with the insertion of each successive wire, the computer 200 determines a base load level so that the load measured for insertion and retention is the net load wherein the weight of already pinned wires is excluded from the total load applied to the load cell 92.

Upon completion of the installation of a first electrical wire 276, the user then repeats the wire installation steps for all required electrical wires 276. The user also performs a process similar to the wire installation process to install any and all required seal plugs 280 (shown in FIG. 6). Upon completion of the insertion of all required electrical wires 276 and seal plugs 280, stop indication 260 is displayed and the user is prompted by prompt 244 to remove electrical connector 270 from the apparatus 20.

When there are numerous insertable members to be placed in the electrical connector body 270, it may be particularly helpful to insert the insertable members in a predetermined order. In this instance, the computer 200 may be preprogrammed to determine the order in which the insertable members are inserted. This pre-ordering of the installation of the insertable members dictates to the user the order for placement so that installation is orderly and avoids problems where already inserted insertable members may surround and obscure the proper cavity, making it difficult for the user to accomplish proper insertion.

It is noted that all prompts and emitted tones may be replaced with or augmented by audible voice synthesized prompts or prerecorded audible verbal prompts and by various color changes on the display screen 230. It is also noted that the various inputted data such as wire identification numbers, applied loads, etc. may be stored by computer 200 in association with the respective assembled electrical and wire bundle assembly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An apparatus to assist a user to insert properly at least one insertable member into a predetermined cavity of a connector body, comprising:

a pinning station comprising:

a load-sensing holding device for holding the connector body; and a camera having a line of sight directed to the connector body;

a computer controlled system in communication with and capable of receiving input from the camera and the load-sensing holding device, said computer controlled system further comprising:

a data input device for inputting identifying data from the at least one insertable member;

a computer program that interprets input from the data input device, the load-sensing holding device, and the camera and provides an output for display; and a display device for receiving the output and displaying visual data to the user, the visual data comprising a visual representation of the connector body and a visual identifier of the proper predetermined cavity for the user to insert the insertable member.

2. An apparatus of claim 1, wherein the load-sensing holding device senses the insertion/retention force used by the user during insertion and subsequent retention testing, said apparatus further comprising a force indicator.

3. An apparatus of claim 2, wherein the force indicator is displayed on the display device as a portion of the visual data.

4. An apparatus of claim 2, wherein the force indicator comprises an audio feedback to the user.

5. An apparatus of claim 4, wherein the audio feedback comprises an alarm that sounds if excess force is used either during insertion of the insertable member or the retention testing.

6. An apparatus of claim 2, wherein the force sensed by the load-sensing holding device for each insertion is the net force that excludes from the absolute force applied at least the weight of accumulated insertable members already inserted into the connector body.

7. An apparatus of claim 1 further comprising a success acknowledgement signal that indicates completion of a proper insertion and acceptable retention of the insertable member.

8. An apparatus of claim 1, wherein the pinning station further comprises a hand rest to facilitate the placement of the user's hand without compromising force sensing by the load-sensing holding device.

9. An apparatus of claim 1, wherein the insertable member is selected from a group consisting of an electrical wire with a pin termination, an optical fiber end, and a seal plug.

10. An apparatus of claim 1, wherein the data input device is selected from a group consisting of a keyboard, a code reader, a color reader, an optical scanner, a voice recognition device, a microphone, a cable tester, and a pointing device.

11. An apparatus of claim 1, wherein the computer program is programmable to identify the sequence of insertion of the insertable members and inform the user the proper insertable member and the proper cavity for insertion in a preordered sequence.

12. An apparatus of claim 1, wherein the camera comprises a video camera and the visual data further comprises real time video of the installation of insertable members into the connector body.

13. An apparatus of claim 12, wherein the visual data further comprises a second real time video image of the area surrounding the proper predetermined cavity, the second real time video image being magnified to enlarge the image.

14. An apparatus of claim 12, wherein at least a portion of the real time video overlays an historical image of the connector body.

15. An apparatus of claim 14, wherein the overlay of the real time video over the historical image is adjustable by the user such that the degree of overlay enables the user to ignore obstructions.

16. An apparatus to assist a user to insert properly at least one insertable member into a predetermined cavity of a connector body, comprising:

a pinning station comprising:

a holding device for holding the connector body; and a load sensor in functional communication with the holding device for determining force applied to the connector body;

a computer controlled system in communication with the load sensor for receiving input therefrom, said computer controlled system further comprising:

a data input device for inputting identifying data from the at least one insertable member;

a computer program that interprets input from the data input device, and the load sensor and provides a perceivable output to the user relating to the insertion of the insertable member, the perceivable output comprising an insertion indicator to identify the proper predetermined cavity for insertion of the insertable member.

17. An apparatus of claim 16, wherein the load sensor senses the insertion/retention force used by the user during insertion and subsequent retention testing, said apparatus further comprising a force indicator.

18. An apparatus of claim 17, further comprising a success acknowledgement signal that indicates completion of a proper insertion and acceptable retention of the insertable member.

19. An apparatus of claim 17, wherein the force indicator comprises an audio feedback to the user.

20. An apparatus of claim 19, wherein the audio feedback comprises an alarm that sounds if excess force is used either during insertion or the retention testing of the insertable member.

21. An apparatus of claim 17, wherein the force sensed by the load sensor for each insertion is the net force that excludes from the absolute force applied at least the weight of accumulated insertable members already inserted into the connector body.

* * * * *